May 12, 1970   A. T. NEWELL III, ET AL   3,511,299
CONDITION RESPONSIVE CLOSURE OPERATING DEVICE
Filed Sept. 1, 1965   2 Sheets-Sheet 1

INVENTORS
ALFRED T. NEWELL III
LARRY WINFRED WOLFE

May 12, 1970  A. T. NEWELL III, ET AL  3,511,299
CONDITION RESPONSIVE CLOSURE OPERATING DEVICE
Filed Sept. 1, 1965  2 Sheets-Sheet 2
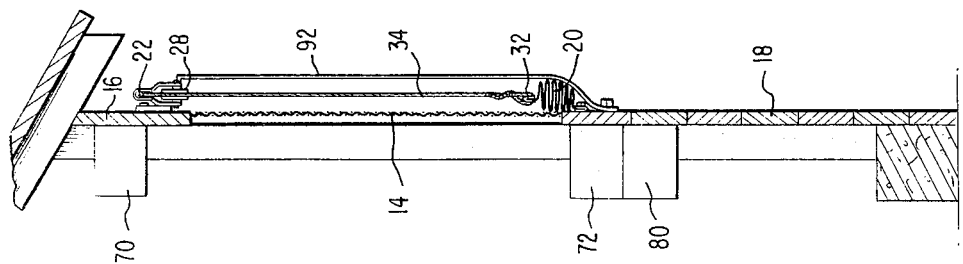
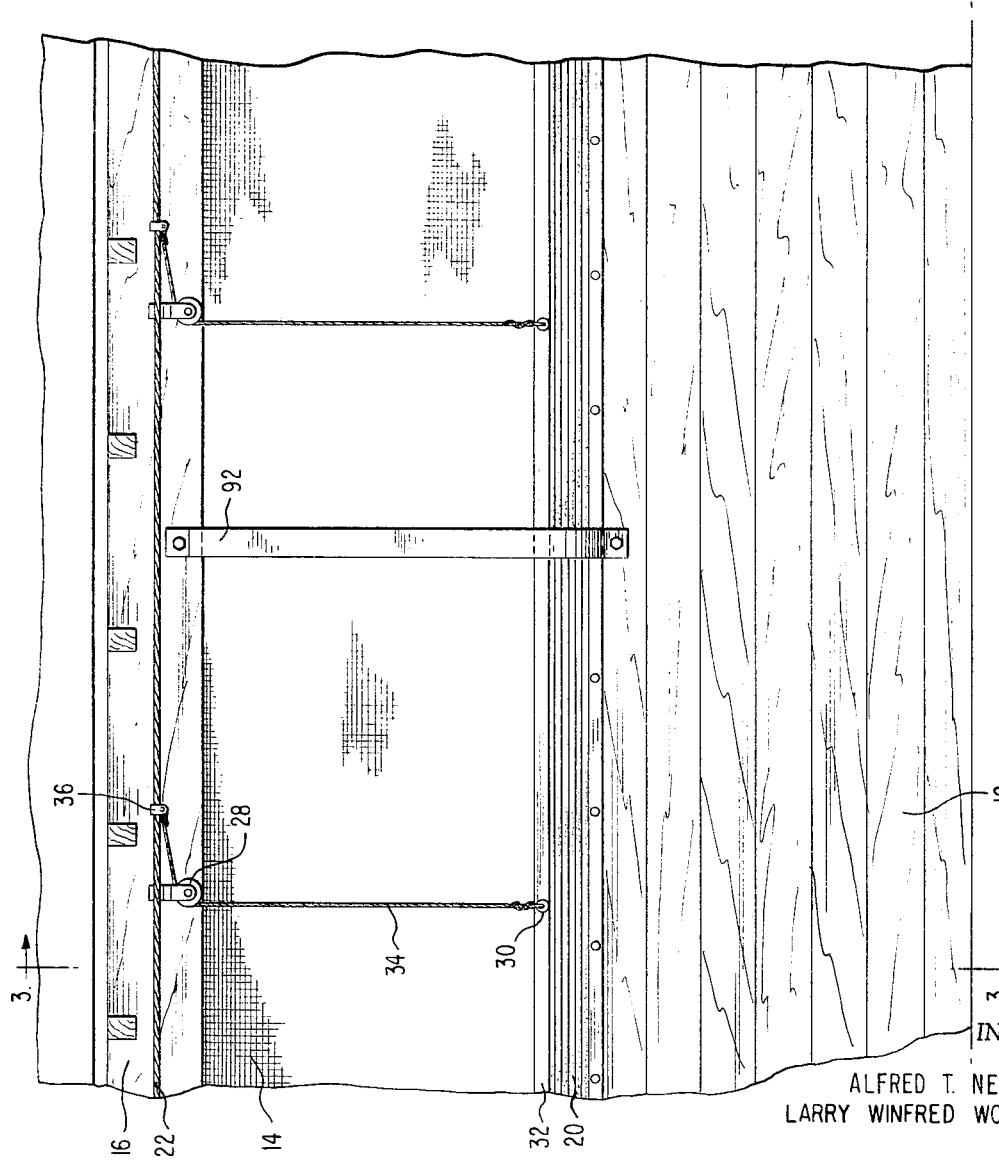
INVENTORS
ALFRED T. NEWELL III
LARRY WINFRED WOLFE

United States Patent Office 3,511,299
Patented May 12, 1970

3,511,299
CONDITION RESPONSIVE CLOSURE OPERATING DEVICE
Alfred T. Newell III, 324 Redwood St., Birmingham, Ala. 35210, and Larry Winfred Wolfe, 454 Boulevard, Gainesville, Ga. 30501
Filed Sept. 1, 1965, Ser. No. 484,360
Int. Cl. E05f *15/20*
U.S. Cl. 160—1                                                                    1 Claim

ABSTRACT OF THE DISCLOSURE

This disclosure relates to curtain raising and lowering mechanisms in general, and more particularly to automatic and manual mechanisms employed in connection with cable or rope suspension systems for curtains on poultry houses. When temperatures are sufficiently high, the curtain is automatically raised to allow ventilation of the poultry house. During periods of prolonged coldness, the curtain is normally closed to conserve heat within the house and automatically open when the humidity reaches a high level that is injurious to the health of the poultry.

---

Heretofore there has been no economical way to automatically position louvers or curtains to provide proper ventilation and at the same time to maintain relatively constant ambient temperature and humidity within poultry houses. The lack of an automatic positioning mechanism arranged to provide temperature control and/or humidity control has subjected poultry, raised in areas subject to continual temperature changes and humidity changes, to unhealthy living conditions. There are times when the humidity in a poultry house may reach an unhealthy level even though the room temperature in the house is such that an automatic temperature controlled curtain will not be activated to increase the ventilation. Such conditions may cause sick birds and wet litter.

It is therefore a general object of the present invention to provide a practical and economical temperature controlled and/or humidity controlled automatic poultry curtain raiser, or actuating mechanism.

An additional object of the present invention is to provide an inexpensive practical system of automatically positioning any or all of the curtains, shutters, windows, or louvers on all sides of a poultry house by a connected series of cables or ropes attached to one central power unit controlled and actuated by a thermostat and/or humidistat and/or time clock thereby substantially stabilizing the ambient room temperature and/or humidity of a poultry house, or coop, and thereby providing controlled ventilation.

A further object of this invention is to provide a simple, inexpensive system for automatically or manually raising and lowering curtains, shutters, windows, or louvers for poultry coops to provide protection against high winds and inclement weather, which system may be adapted to existing poultry houses and may be installed by non-skilled labor.

A still further object of the present invention is to provide a poultry curtain raising and lowering mechanism which establishes maximum possible ventilation while maintaining a uniform selected room temperature and humidity.

Another object of the present invention is to provide a poultry curtain raising and lowering mechanism which opens the curtains automatically until either a desired relative humidity level is attained or until a minimum selected temperature is reached, then repositions the curtains automatically.

With the foregoing and other objects in view, the invention resides in the following specification and claims, certain embodiments and details of construction being illustrated by the specification when considered with the accompanying drawings in which:

FIG. 2 is a fragmentary elevation view of the outside of the side wall of FIG. 1;

FIG. 3 is a sectional view taken on line 3—3 of FIG. 2; and

Figure 1:
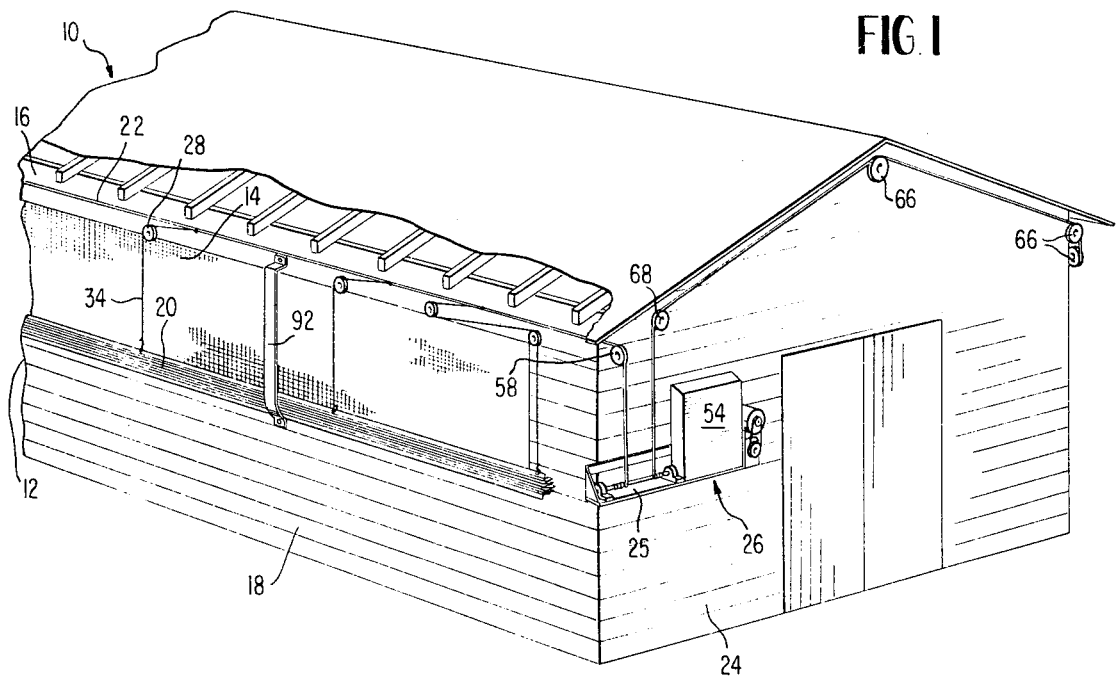
FIG. 1 is a fragmentary isometric view of one side wall and an end wall of the outside of a poultry house, or coop, illustrating an automatic curtain raising apparatus attached thereto.

Referring more particularly to the drawings, a poultry coop or house is indicated generally by reference numeral 10. Poultry house 10 is provided with a pair of side walls 12 and a pair of end walls 24. Each of the side walls are provided with a screened section 14, a plate plank 16 positioned above the screened section 14 and a close-panelled section 18 formed from any suitable siding materials and positioned below the screened section 14. Side wall 12 is also provided with a curtain 20 secured by nails, or screws, or by any other convenient means, to the upper edge of panelled section 18 at the bottom of screened section 14. The curtain, which is made of a suitable, flexible, weather resistant material, is arranged in such a manner that it may be extended upward to completely cover the screened opening.

In a preferred form of the present invention, a main-line draw cable 22 of suitable flexible material, such as wire, rope, nylon cord, wire rope or chain, extends horizontally along the side walls of the poultry house adjacent plate plank 16 to an end wall 24 where it is secured to a power unit 26 attached to the end wall.

Attached to plank 16 are small pulleys 28, which are preferable regularly spaced at intervals of approximately four to eight feet. Flexible curtain 20 is provided with holes, or eyelets, 30 along an upper edge 32 at intervals of approximately the same length as the spacing between the pulleys attached to plank 16. Upper edge 32 of curtain 20 may be of stiffened construction, or it may be provided with a rigid member attached thereto in any suitable manner, to hold the curtain in a horizontally stable position. A plurality of auxiliary draw cables 34, also of suitable flexible material, are secured at one end thereof to each of the curtain eyelets 30. From the upper edge of curtain 20, the auxiliary cables 34 extend first vertically to and around pulleys 28 then extend horizontally to an attaching means 36, such as any suitable clamp secured to the main draw cable 22, where they are secured at their opposite end.

Figure 4:
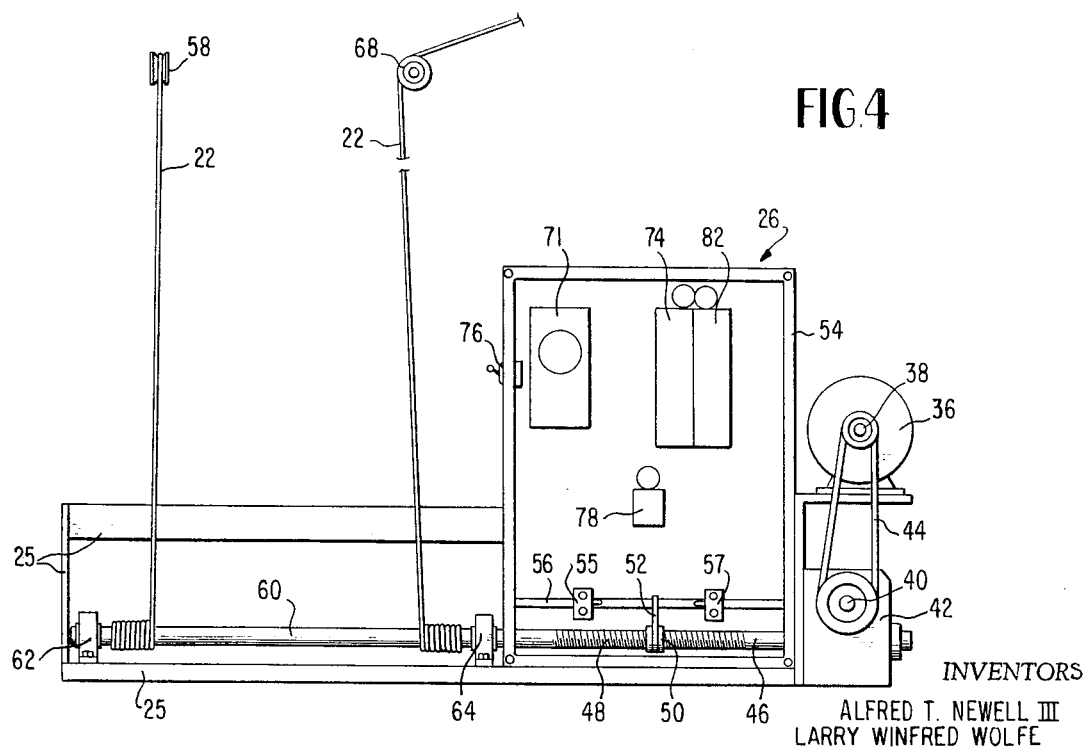
FIG. 4 is a fragmentary, enlarged, detailed view of an elevation of the power unit mounted on the wall of the poultry house, or any other convenient location, illustrating the automatic temperature and/or humidity actuated drive mechanism for the curtain, the connecting cables leading to the curtain and the attachment of the connecting cables to the drive mechanism.

Referring paticularly to FIGS. 1 and 4, power unit 26 is preferably positioned on a frame 25 attached at one side of end wall 24. In the preferred form of the present invention, power unit 26 is provided with a reversible electric motor 36. Motor 36 is provided with an output drive shaft 38 connected through a belt-type driving means 44 to an input shaft 40 of a gear speed reduction means, or any other suitable speed reducing means, 42. Driving means 44 communicates with output shaft 38 of the electric motor and input shaft 40 of the gear speed reducting means. The gear speed reduction means is provided with an output shaft 46 of relatively long length, and a threaded portion 48 of shaft 46 is located near the gear speed reducing means. An internally threaded ring 50 is provided with a radially outward extending flange portion 52 is positioned on the threaded portion 48 of shaft 46. The threaded portion of shaft 46 is preferably located within a housing 54 and a shaft, or rod member, 56 is positioned above shaft 46 in parallel relationship therewith within housing 54 such that the end of flange 52 contacts rod member 56. As shaft 46 rotates, ring 50 and flange 52 thereof constitute a travelling means which moves axially of shaft 46, as contact between the flange and rod member 56 prevents rotation.

A first bearing means 62 in which shaft 46 is journalled is attached to frame 25 at the outside end of the shaft furthest from gear speed reducing means 42; and a second bearing means 64, also attached to framework 25 and through which shaft 46 is journalled, is located adjacent the outside of housing 54. A main draw cable 22, positioned parallel with a plate plank 16 on a side wall adjacent the side of end wall 24 to which power unit 26 is attached, is looped over a pulley 58, which is suitably attached to end wall 24. From pulley 58, draw line 22 extends vertically downward and one end thereof is suitably attached to the outside end of an extended portion 60 of shaft 46 between bearing means 62 and 64. Although shaft 46 is illustrated as a bar of constant diameter, the extended portion 60 may consist of, or be provided with, a drum of larger diameter. Draw line 22 from the side wall opposite the side near which the power unit is attached to end wall 24 is carried along the end wall through a system of pulleys 66 and over a pulley 68 to extend vertically downward to shaft 46 where it is secured at one end to extended portion 60. Preferably, main draw cable 22 from pulley 58 is secured to shaft 46 near the first bearing means 62, and the main draw cable from pulley 68 is attached to shaft 46 near the second bearing means 64. The ends of main draw cables 22, not attached to shaft 46 but located near the end wall opposite the end wall to which power unit 26 is secured, may be attached to a weight or other suitable biasing means, not shown, to maintain the cables in a taut condition.

Reversible motor 36 is actuated by one of five means: namely, a thermostat, a humidistat, a time clock control, a manual hand switch or a combination of the time clock control and thermostat or humidistat control. The thermostatic and humidistatic controls may be positioned in any convenient location within the poultry house 10, such as on plank 16 and/or panelled section 18, as illustrated by the reference numerals 70, 72 and 80 in FIG. 3. Appropriate electrical connections, not shown, may be employed to connect the various actuating means to the reversible electric motor. A thermostat 70 comprised of any well-known suitable temperature sensing means, may be employed to actuate power source reversing relay 71, positioned within housing 54 and connected to electric motor 36, upon the rise and fall of temperature. Preferably, a time clock 74, also positioned within housing 54 and connected between a source of electrical power and motor 36, is connected to allow electric motor 36 to function generally for one or two minutes out of ten minutes. Thus, during the majority of time, the electric power, which operates electric motor 36, is disconnected by time clock means 74, and therefore curtain 20 may be raised or lowered in incremental steps depending upon the setting of the time clock.

In another embodiment of the present invention, time clock 74 is connected to the system only during the period of time in which temperature is rising thus causing incremental movement of the curtain 20 only during the period in which it is being lowered.

During periods in which temperature is falling, power reversing relay 71 is activated to connect a power source to electric motor 36 causing the motor to rotate in a direction such that the output shaft 46 of gear speed reducing means 42 is rotated in a direction to cause the main draw cables 22 to be wrapped around the extended portion 60 thus causing curtains 20 to be raised. When the temperature is rising, it is desirable to lower curtains 20; therefore, thermostat 70 activates power reversing relay 71 reversing the excitation on electric motor 36 thus causing it to rotate in an opposite direction. Consequently, during a period of rising temperatures shaft 46 is rotated in a direction which unwinds the main draw cables 22 from extended portion 60. From the foregoing, it is readily observed that when time clock 74 functions to permit electric motor 36 to operate, thermostat 70 controls the direction of rotation of shaft 46 thereby controlling the raising or lowering of curtain 20.

Under conditions in which humidity is high but temperature is not of such a level that thermostat 70 activates motor 36 thereby lowering curtain 20, a humidistat 72, which functions when the humidity rises to a predetermined level, activates a relay 78 positioned in housing 54. Relay 78 is provided to disconnect temperature control by thermostat 70 and to activate power reversing relay 71 which connects a source of electrical power to motor 36 thereby actuating the motor in a direction to lower curtain 20 when power is provided by time clock 74. Thus, in a preferred embodiment of the present invention, relay 78 constitutes a means for disconnecting temperature control such that an override of the temperature control is attained at a maximum predetermined humidity level. However, if the humidity is substantially high with respect to temperature, increasing the curtain opening in an attempt to attain a maximum desirable humidity level may cause the temperature within the house to fall below a predetermined minimum level desirable for healthy poultry living conditions. Preferably therefore, a second therostat 80 is electrically connected in series with humidistat 72 such that the humidity control circuit may be disconnected at a minimum temperature level. In this manner, the poultry house won't become colder than the setting of thermostat 80 while the humidity control circuit is attempting to dispell moisture in the house by opening the curtains. When thermostat 80 opens the humidity control circuit, it activates power reversing relay 71 which causes motor 36 to close the curtain. When either the temperature or humidity rises again to an undesirable level, the curtain will be opened again by means of either thermostat 70 or humidistat 72. An additional time clock 82 may be associated with relay 78 such that motor 36 is permitted to function for approximately one or two minutes out of each hour. Thus, during the remainder of the time in which the humidity control circuit is functioning, the electrical power to motor 36 may be disconnected. Thus, incremental distance opening of the curtains may also be provided during humidity control in much the same manner as time clock 74 may be employed to establish an incremental distance opening or closing of curtain during the period in which the curtains are operated under temperature control.

Rod member 56 is provided with limit switches 55 and 57 positioned thereon. The limit switches may be secured against movement at any position on rod member 56 and may be connected to establish an electrical power cut-off to cease the operation of electric motor 36 when the curtain reaches desired maximum and minimum open positions. Limit switches 55 and 57 are preferably actuated by pressure upon contact between flange portion 52 of travelling ring 50 and a limit switch at opposite ends of ring travel. The limit switches are adjustable in position to enable power unit 26 to be employed on various poultry houses having different heighth windows and curtains.

A plurality of bracket means, such as indicated by reference numeral 92, attached in any suitable manner at one end to plank 16 and at an opposite end in any suitable manner to panelled portion 18, may be provided to maintain curtain 20 in a given spaced relationship with respect to screened portion 14.

Manual operation of power unit 26 may be achieved by means of a manual switch 76 positioned on housing 54. Switch 76 may be a three-position switch in which the power supply for the thermostat, humidistat and time clock components, which establish automatic operation of the power unit, may be electrically connected through one switch position to power reversing relay 71. Additionally, each of the two opposed activating positions of power reversing relay 71 may be individually electrically connected through the remaining two switch positions to the power supply thereby providing a means for accomplishing the manual operation. Reversing relay 71 for electric motor 36 may therefore be activated either automatically in both directions or manually in both directions.

In addition to manual control established by means of switch 76, an additional switch, similar to switch 76 but not shown, may be provided to enable control of the opening and closing of the curtains solely by means of time clocks 74 and/or 82. This type of operation may be desirable during periods in which the humidity and temperature remain constant within the maximum and minimum desired limits and in which fresh air ventilation of the poultry house is still desirable. Thus, ventilation may be attained by a time clock control separate from either a manual control or an automatic atmospheric condition control.

Although the curtain is illustrated as attached below screened opening 14 and the cabling and drive mechanism is described and illustrated in such a manner that the curtain may be closed by raising the curtain, it is within the contemplation of the present invention that the curtain may be attached above the screened opening 14 and closed by lowering the curtain.

Furthermore, the control unit may be mounted near either side wall or it may even be positioned at any convenient location on an end wall or on a side wall and it may be employed to pull a greater number of cables than the number illustrated by the drawings. Multiple control units may also be employed and a sprocket and roller chain arrangement may also be employed instead of the cable and shaft arrangement as illustrated and described. Additionally, the relays and time clock mechanisms may be positioned within the poultry house instead of within the power unit housing as described.

The invention may therefore be embodied in other specific forms without departing from the spirit or essential characteristics thereof. Consequently, the present embodiment is to be considered in all respects as illustrative and not restrictive, the scope of the invention being indicated by the appended claims rather than by the foregoing description of all changes which come within the meaning and range of equivalency of the claims are intended to be embraced therein.

What is claimed and desired to be secured by U.S. Letters Patent is:

1. A poultry house, comprising: side walls having a ventilating opening and roof means substantially completely enclosing the poultry house; means within the poultry house for accommodating and raising poultry; ventilating means for selectively admitting outside air into the poultry house through said opening only upon actuation; said ventilating system means including a curtain mounted for movement between a first position covering said opening and a second retracted position exposing said opening, power means actuatable to move said curtain between said first position and said second position; said ventilating means further including means responsive to and controlled by air temperature within said poultry house for actuation of said power means for retracting said curtain toward said second position to admit outside air into the poultry house only within a predetermined, relatively high temperature range to provide ventilation of the poultry house during periods of relatively high temperature, and for moving said curtain to said first position to discontinue the ventilation during periods of relatively low temperatures; said ventilating means further including means responsive to and controlled by the humidity of the air within the poultry house for actuation of said power means independently of said temperature-responsive means for retracting said curtain toward said second position to admit outside air into the poultry house at relatively high humidity for reducing the humidity within the poultry house during periods of prolonged coldness when the temperature-responsive means does not actuate said ventilation means to reduce undesirably high humidity within the poultry house that is injurious to the health of the poultry, said power means including a reversible electric motor, cable suspension means mounted on said walls drivingly between said curtain and said motor, and current reversing means in circuit with said motor, said humidity means and said temperature means, wherein said ventilating means further includes additional temperature control means for disconnecting said humidity means from said power means at temperatures below a minimum predetermined temperature; and wherein said first named temperature means is operable to energize said motor at sensed temperatures between a predetermined maximum temperature and said predetermined minimum temperature.

References Cited

UNITED STATES PATENTS

| | | | |
|---|---|---|---|
| 1,953,923 | 4/1934 | Bulley | 236—44 |
| 2,261,852 | 11/1941 | Mathis | 236—44 |
| 2,754,063 | 7/1956 | Kensten | 165—21 X |
| 2,837,286 | 6/1958 | Ross | 236—44 |
| 2,974,870 | 3/1961 | Pitts | 236—44 |
| 2,979,265 | 4/1961 | Stock | 236—44 |
| 2,678,212 | 5/1954 | Flostroy | 49—29 |
| 3,042,001 | 7/1962 | Dubie et al. | 160—5 |
| 3,235,247 | 2/1966 | Tolson | 49—31 |

FOREIGN PATENTS 400,953 10/1933 Great Britain.

PETER M. CAUN, Primary Examiner